(12) United States Patent
Tononishi

(10) Patent No.: US 9,515,300 B2
(45) Date of Patent: Dec. 6, 2016

(54) ELECTRIC STORAGE DEVICE, COVERING SHEET, AND CONTAINER COVERING METHOD

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 176 days.

(21) Appl. No.: 14/050,227

(22) Filed: Oct. 9, 2013

(65) Prior Publication Data

US 2014/0106204 A1    Apr. 17, 2014

(30) Foreign Application Priority Data

Oct. 12, 2012 (JP) ................................. 2012-227043
Sep. 5, 2013 (JP) ................................. 2013-184027

(51) Int. Cl.
*H01M 2/04* (2006.01)
*H01M 2/02* (2006.01)
*H01M 2/10* (2006.01)

(52) U.S. Cl.
CPC .............. *H01M 2/043* (2013.01); *H01M 2/02* (2013.01); *H01M 2/0434* (2013.01); *H01M 2/1016* (2013.01); *H01M 2/1094* (2013.01); *Y10T 29/49108* (2015.01)

(58) Field of Classification Search
CPC .... H01M 2/043; H01M 2/0434; H01M 2/021; H01M 2/347; H01M 2/08; H01M 2/06; H01M 2/0217
See application file for complete search history.

(56) References Cited

U.S. PATENT DOCUMENTS

| | | | |
|---|---|---|---|
| 2003/0129483 A1* | 7/2003 | Gross | 429/127 |
| 2004/0048149 A1* | 3/2004 | Gross et al. | 429/127 |
| 2005/0017678 A1* | 1/2005 | Hiratsuka et al. | 320/112 |
| 2008/0152994 A1* | 6/2008 | Yamagami | H01M 2/22 429/100 |
| 2008/0292956 A1* | 11/2008 | Hong et al. | 429/164 |
| 2012/0028094 A1* | 2/2012 | Kim | H01M 2/0242 429/99 |
| 2012/0033845 A1* | 2/2012 | Maleki et al. | 381/386 |

FOREIGN PATENT DOCUMENTS

| | | |
|---|---|---|
| JP | 4-10955 | 1/1992 |
| JP | 2002-184364 A | 6/2002 |
| JP | 2004-172063 A | 6/2004 |
| JP | 2011-175942 A | 9/2011 |

* cited by examiner

*Primary Examiner* — Kenneth Douyette
(74) *Attorney, Agent, or Firm* — McGinn IP Law Group, PLLC

(57) ABSTRACT

There is provided an electric storage device including a power generating element, a housing container for housing the power generating element and including an upper face, a bottom face, and four side faces and a covering member formed by winding an insulating sheet around the housing container. The housing container includes round portions or chamfered portions formed between the adjacent side faces and round or chamfered boundary portions formed between the bottom face and the side faces. The covering member covers parts of the boundary portions, the side faces, and the round portions or the chamfered portions.

20 Claims, 12 Drawing Sheets

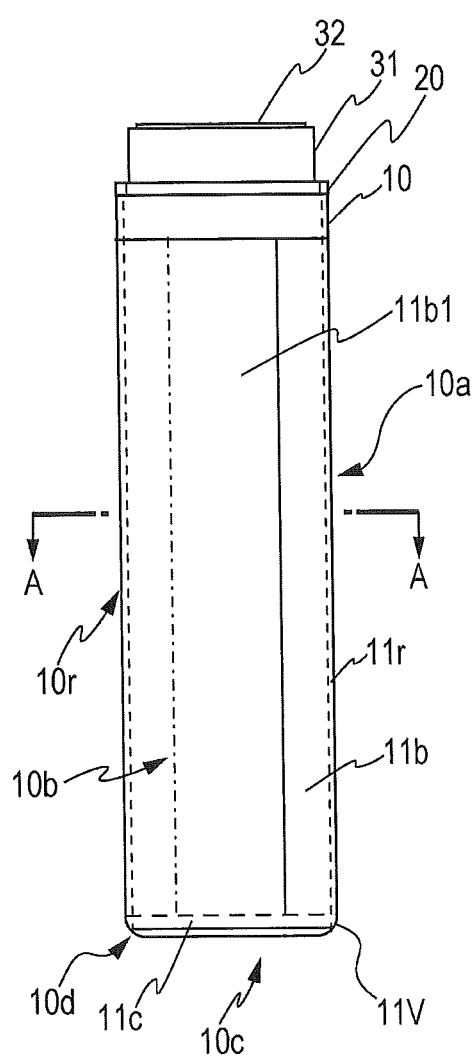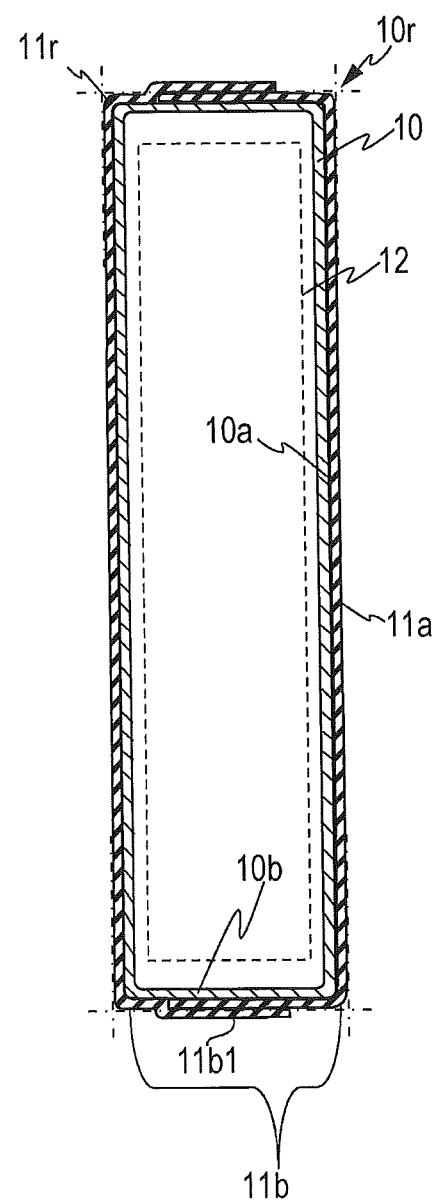

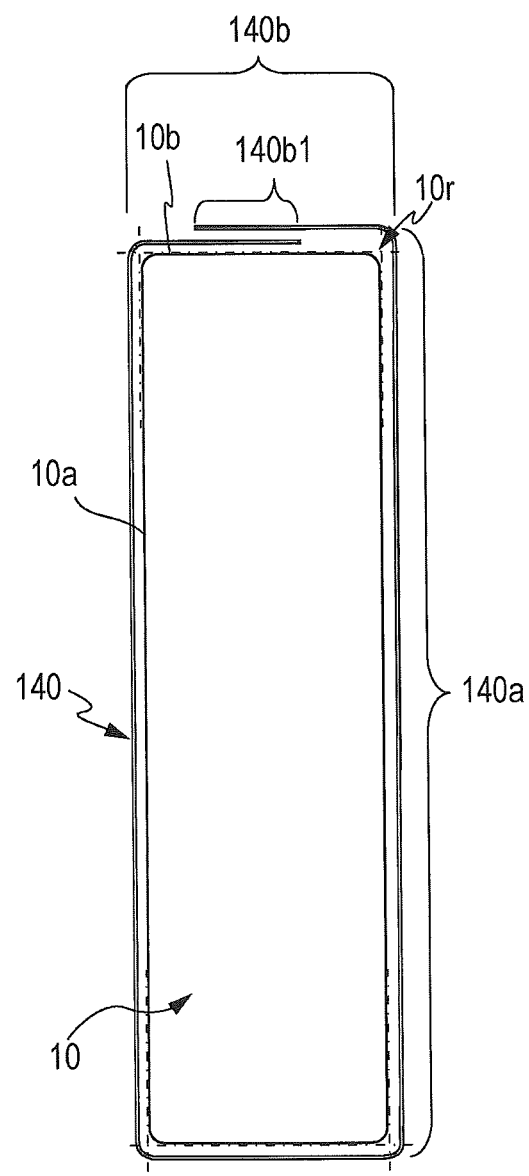

ELECTRIC STORAGE DEVICE, COVERING SHEET, AND CONTAINER COVERING METHOD

CROSS-REFERENCE TO RELATED APPLICATIONS

This application claims the benefit of Japanese patent application Nos. 2012-227043, filed on Oct. 12, 2012, and 2013-184027, filed on Sep. 5, 2013, which are incorporated by reference.

FIELD

The present invention relates to an electric storage device such as a secondary battery and other batteries, a covering sheet of the electric storage device, and a container covering method.

BACKGROUND

Secondary batteries are in widespread use for powering electronic devices such as cell-phones and IT devices, not to mention replacing primary batteries. In particular, because nonaqueous electrolyte secondary batteries represented by lithium ion batteries have high energy density, application of them to industrial large electric devices such as electric cars is facilitated.

The nonaqueous electrolyte secondary battery includes a metallic container as a housing container, in general. Because the metallic container has electric conductivity, a short circuit may accidentally occur through the metallic container during use of the battery. Therefore, for the purpose of preventing the short circuit, covering of the metallic housing container with an insulating film is practiced widely and conventionally (see JP-A-2011-175942 (FIG. 14), for example).

The nonaqueous electrolyte secondary battery in the related art described above has the following problems. In many cases, as the insulating film, a cylindrical heat shrinkable tube is applied as disclosed in JP-A-2011-175942 and the tube is put over the housing container of the battery and heated and shrunk to complete the covering. However, it is difficult to obtain the finished covering which exactly conforms to a shape of the metallic container. Moreover, such inexact covering has insufficiently shrunk parts. If the battery is exposed to a thermally severe environment, e.g., if the battery is left for a long period of time or used continuously in a hot place, the parts may shrink again and come off covered portions and, as a result, a surface of the housing container may be exposed.

As described above, in the conventional electric storage device including the nonaqueous electrolyte secondary battery, it is difficult to accurately and properly put insulating covering conforming to the shape of the housing container.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage device accurately covered along an outer shape of a housing container with a covering sheet, a covering sheet for covering the electric storage device, and a container covering method.

A first aspect of the present invention provides an electric storage device including a power generating element, a housing container for housing the power generating element and including an upper face, a bottom face, and four side faces and a covering member formed by winding an insulating sheet around the housing container. The housing container includes round portions or chamfered portions formed between the adjacent side faces and round or chamfered boundary portions formed between the bottom face and the side faces. The covering member covers parts of the boundary portions, the side faces, and the round portions or the chamfered portions.

BRIEF DESCRIPTION OF THE DRAWINGS

The foregoing and other features of the present invention will become apparent to one skilled in the art to which the present invention relates upon consideration of the present invention with reference to the accompanying drawings, wherein:

FIG. 4A shows a side view of the structure of the nonaqueous electrolyte secondary battery according to the embodiment of the present invention and FIG. 4B shows a schematic sectional view taken along straight line A-A in FIG. 4A;

FIG. 11 shows a view explaining another example of the covered state with the covering sheet according to the embodiment of the present invention.

DESCRIPTION OF EMBODIMENTS

Figure 1:
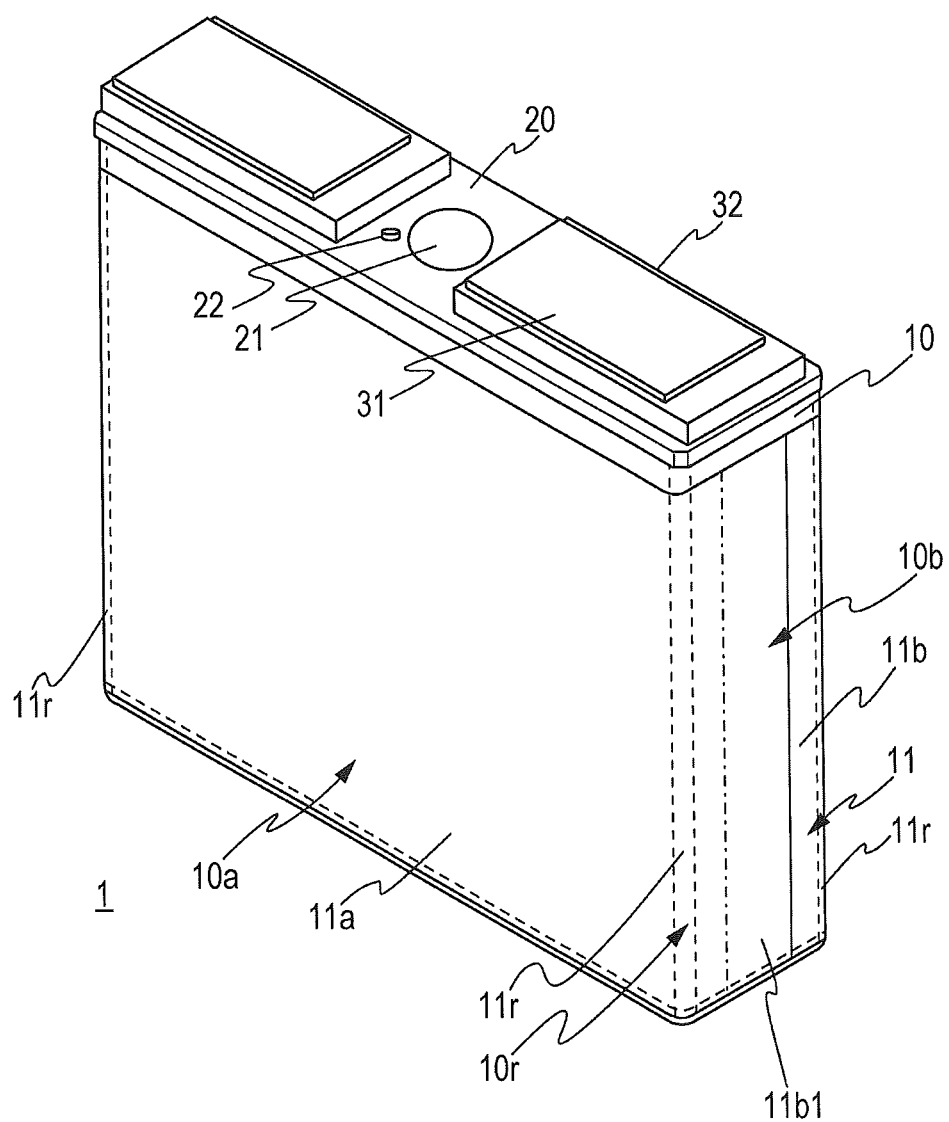
FIG. 1 shows a perspective view of a structure of a nonaqueous electrolyte secondary battery according to an embodiment of the present invention.

A first aspect of the present invention provides an electric storage device including: a power generating element; a housing container for housing the power generating element and including an upper face, a bottom face, and four side faces; and a covering member formed by winding an insulating sheet around the housing container, wherein the housing container includes: round portions or chamfered portions formed between the adjacent side faces; and round or chamfered boundary portions formed between the bottom face and the side faces, and the covering member covers parts of the boundary portions, the side faces, and the round portions or the chamfered portions.

A second aspect of the present invention provides the electric storage device according to the first aspect of the present invention, wherein a three-dimensional shape of the covering member conforms to an outer shape of the housing container.

A third aspect of the present invention provides the electric storage device according to the first aspect of the present invention, wherein the covering member is in close contact with a surface of the housing container.

A fourth aspect of the present invention provides the electric storage device according to the first aspect of the present invention, wherein the boundary portions of the housing container have side portions and corner portions conforming to a planar shape of the bottom face and notches are formed at positions of the insulating sheet corresponding to the corner portions of the housing container.

A fifth aspect of the present invention provides the electric storage device according to the first aspect of the present invention, wherein the insulating sheet has an adhesive portion on a face of at least a portion facing the housing container.

A sixth aspect of the present invention provides the electric storage device according to the first aspect of the present invention, wherein the insulating sheet is formed by a plurality of sheets.

A seventh aspect of the present invention provides the electric storage device according to the first aspect of the present invention, wherein the insulating sheet has a heat-shrinkable property, and the covering member covers the housing container with the insulating sheet heat-shrunk at least at the portions of the boundary portions.

An eighth aspect of the present invention provides a power supply module including at least one electric storage device identical with the electric storage device according to any one of the first to seventh aspects of the present invention.

A ninth aspect of the present invention provides a covering sheet to be wound around a container including an upper face, a bottom face, and four side faces, round portions or chamfered portions formed between the adjacent side faces, and round or chamfered boundary portions formed between the bottom face and the side faces, the boundary portions having side portions and corner portions conforming to a planar shape of the bottom face, wherein notches are formed at positions corresponding to the corner portions of the housing container.

A tenth aspect of the present invention provides the covering sheet according to the ninth aspect of the present invention, wherein the notches have trapezoidal shapes.

An eleventh aspect of the present invention provides the covering sheet according to the ninth aspect of the present invention, wherein an adhesive portion is formed at least at a portion on a surface facing a surface of the container.

A twelfth aspect of the present invention provides the covering sheet according to any one of the ninth aspect of the present invention, the covering sheet having an entire width which corresponds to a half or greater part of an entire circumference of the four side faces and the round portions or the chamfered portions of the container.

A thirteenth aspect of the present invention provides a container covering method of covering a container including an upper face, a bottom face, and four side faces, round portions or chamfered portions formed between the adjacent side faces, and round or chamfered boundary portions formed between the bottom face and the side faces, the boundary portions having side portions and corner portions conforming to a planar shape of the bottom face, the method including: a winding step of winding an insulating sheet around the side faces and the round portions or the chamfered portions of the container; and a treatment step of treating the wound insulating sheet to form a covering member for covering parts of the boundary portions and the side faces.

A fourteenth aspect of the present invention provides the container covering method according to the thirteenth aspect of the present invention, wherein an edge of the insulating sheet protrudes from the side faces to reach the parts of the boundary portions in the winding step and a three-dimensional shape of the covering member is caused to conform to an outer shape of the housing container in the treatment step.

A fifteenth aspect of the present invention provides the container covering method according to the fourteenth aspect of the present invention, wherein the insulating sheet is a heat-shrinkable sheet having notches formed at positions corresponding to the corner portions of the housing container and the treatment step includes a step of heating a portion of the insulating sheet including the notches.

Preferred embodiments of the present invention will be described hereinafter with reference to the drawings.

1. Nonaqueous Electrolyte Secondary Battery

Figure 2:
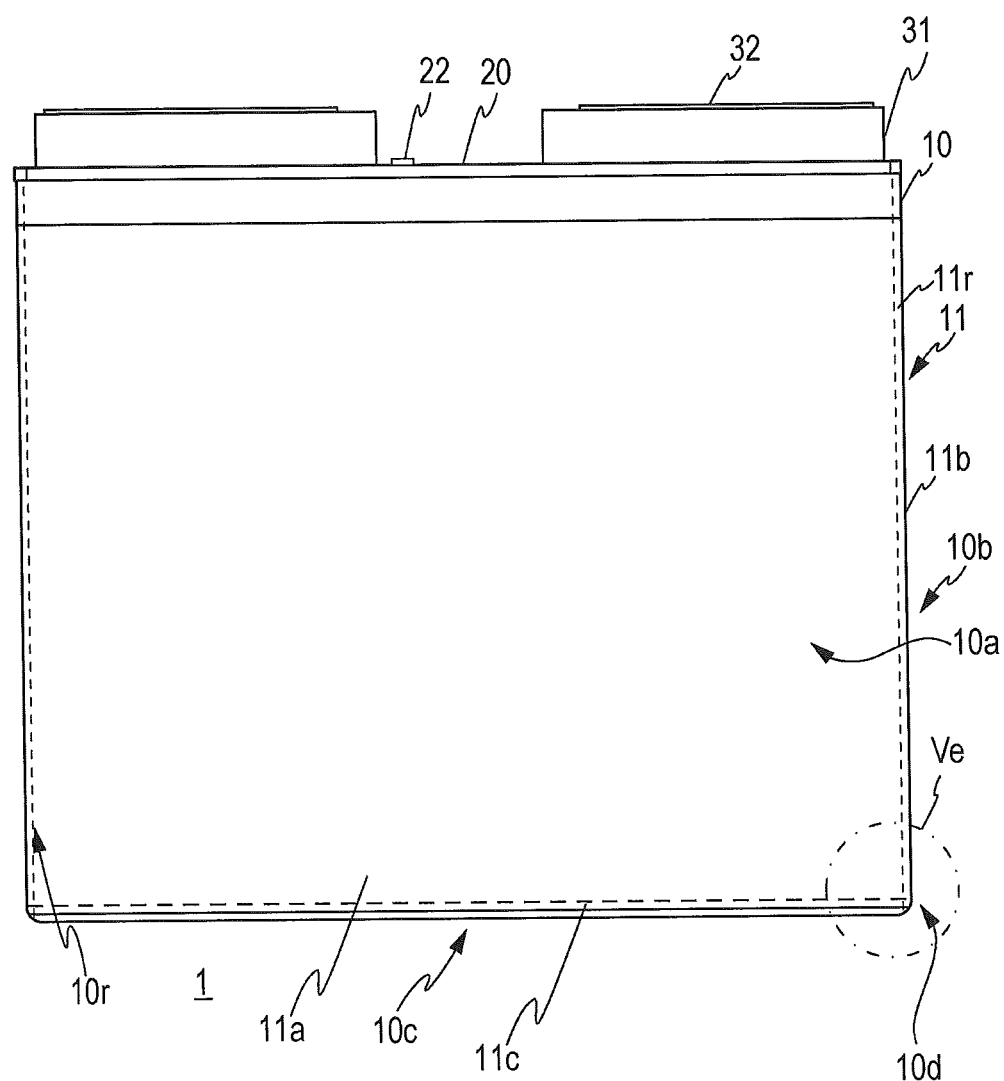
FIG. 2 shows a front view of the structure of the nonaqueous electrolyte secondary battery according to the embodiment of the present invention.
Figure 3A:
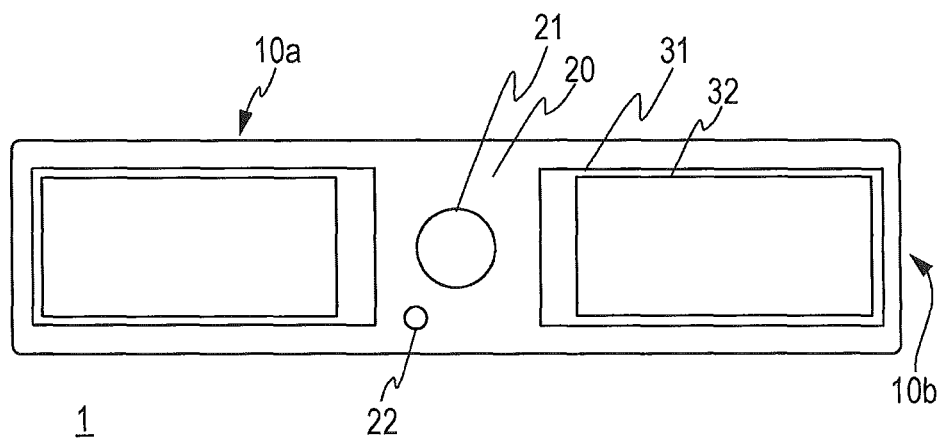
FIG. 3A shows a plan view of the structure of the nonaqueous electrolyte secondary battery according to the embodiment of the present invention and FIG. 3B shows a bottom view of a structure of a lid portion of the nonaqueous electrolyte secondary battery according to the embodiment of the present invention.
Figure 3B:
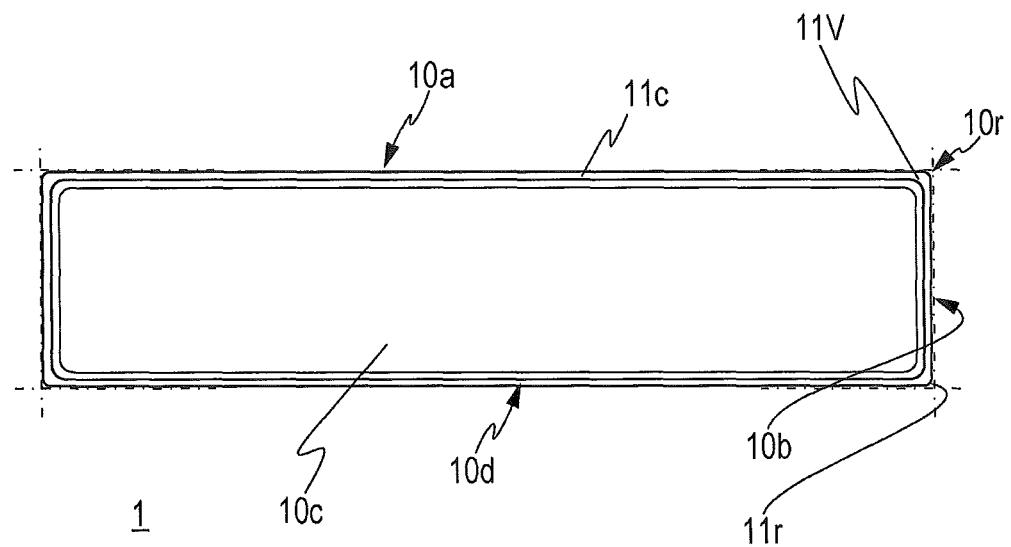

FIG. 1 shows a perspective view of a schematic structure of a nonaqueous electrolyte secondary battery 1 according to the embodiment of the present invention. FIG. 2 shows a front view of the structure of the same. FIG. 3A shows a plan view of the same and FIG. 3B shows a bottom view of the same. FIG. 4A shows a side view of the same and FIG. 4B is a schematic sectional view taken along straight line A-A in FIG. 4A.

As shown in FIGS. 1 to 4, the nonaqueous electrolyte secondary battery 1 includes, as an outer covering, a housing container in an outer shape of a substantially quadrangular prism formed by an aluminum box-shaped container main body 10 having an opening and a plate-shaped lid portion 20 for sealing the opening of the container main body 10 and made of the same material as the container main body.

In the container main body 10, a power generating element having a positive electrode and a negative electrode which are band-shaped electrodes wound into an elongated circular cylindrical shape with separators interposed therebetween and an electrolyte solution (not shown) are housed. Metal foil of each of the positive and negative electrodes is exposed on each end of the power generating element and disposed to face each of paired short-side side faces (hereafter referred to as "short side faces") 10b of the container main body 10. The electrodes of the power generating element are electrically connected to electrode terminals 31 provided onto the lid portion 20 so that electric power is taken out of the housing container.

Conductive paths connecting the electrode terminals 31 and the power generating element are insulated from the housing container by gaskets 32 which are insulating bodies made of synthetic resin. The gaskets 32 also have functions of sealing spaces and clearances between the conductive paths and the housing container so as to prevent leakage of the electrolyte solution from inside the housing container.

The lid portion 20 is provided with a safety valve 21 which is opened when internal pressure of the nonaqueous electrolyte secondary battery 1 becomes a predetermined value or higher. Moreover, a filling opening through which the electrolyte solution is filled after the lid portion 20 and the container main body 10 are sealed by laser welding or the like is provided and the filling opening is sealed with a sealing plug 22 after the electrolyte solution is filled.

Furthermore, a covering member 11 having a three-dimensional shape corresponding to an outer shape of the container main body 10 and in close contact with a surface of the container main body is provided around the container main body 10. The covering member 11 is formed by heat-shrinking insulating sheets (described later) and is formed by long side face coverings 11a in positions facing paired longitudinal side faces (hereafter referred to as "long side faces") 10a of the container main body 10, short side face coverings 11b in positions facing the short side faces 10b of the container main body 10, ridge face coverings 11r defined by broken lines in the drawings and in positions corresponding to round faces 10r formed between the long side faces 10a and the short side faces 10b of the container main body 10, and boundary face coverings 11c defined by broken lines in the drawings and for covering boundary faces 10d between a bottom face 10c, the long side faces 10a, the short side faces 10b, and the round faces 10r of the container main body 10 as shown in FIGS. 2 and 3B. As shown especially in FIGS. 4A and 3B, portions of the boundary face coverings 11c and for covering vertexes where the long side faces 10a and the short side faces 10b are adjacent to each other with the round faces 10r sandwiched therebetween are distinguished as vertex face coverings 11V from other portions. Detailed structures of the round faces 10r and the boundary faces 10d will be described later.

Next, as shown in a sectional view in FIG. 4B, the covering member 11 integrally covers an entire circumference of the container main body 10 with opposite ends of two split covering members 11 overlapping each other on the short side faces 10b of the container main body 10 housing the power generating element 12. Here, overlap portions of the covering members of the short side face coverings 11b are referred to as layered face coverings 11b1. In the drawings, a thickness of the covering member 11 is exaggerated for purposes of illustration. One end of the covering member 11 which is exposed outside is shown in solid line. Opposite end of the covering member 11 which directly overlaps the container main body 10 is shown in one-dot chain line.

In the structure described above, the nonaqueous electrolyte secondary battery 1 corresponds to an electric storage device in the present invention, the housing container formed by the container main body 10 and the lid portion 20 corresponds to a housing container in the present invention, and the covering member 11 corresponds to a covering member in the present invention. The face of the lid portion 20 provided with the electrode terminals 31, the gaskets 32, and the like corresponds to an upper face of the housing container in the present invention, and the bottom face 10c of the container main body 10 corresponds to a bottom face in the present invention. The paired long side faces 10a and the paired short side faces 10b of the container main body 10 correspond to four side faces in the present invention, and round faces 10r positioned between these side faces correspond to round portions in the present invention.

The nonaqueous electrolyte secondary battery 1 in the embodiment having the above-described structure is characterized by having the covering member 11 for covering the container main body 10 while accurately conforming to the shape of the container main body 10.

The container main body 10 is formed by drawing an aluminum metal plate as a raw material into the box shape having the opening. At this time, due to accuracy and press pressure of metal molds, hardness and a thickness of the raw material, and the like, respective boundaries between the long side faces 10a, the short side faces 10b, and the bottom face 10c are formed not as ridges or corners but as curved faces.

In particular, the boundaries between the long side faces 10a and the short side faces 10b are formed as the round faces 10r which form curved faces curved in two-dimensional convex shapes convexed outwardly of the container main body 10 as shown especially in FIG. 3B. Therefore, the round faces 10r are shown as curved lines in a state shown in FIG. 3B. In FIG. 3B and other drawings, auxiliary lines for explanation and respectively parallel to the long side faces 10a and the short side faces 10b are drawn as one-dot chain lines in order to clearly show locations of the round faces 10r.

Moreover, the boundary faces 10d between the bottom face 10c, the long side faces 10a, and the short side faces 10b, and between the bottom face 10c and the round faces 10r form round shapes as shown in FIGS. 2 and 4A, i.e., curved faces curved in convex shapes convexed outwardly of the container main body 10. In particular, vertex portions 10d1 which correspond to the vertexes formed by the long side faces 10a, the short side faces 10b, and the bottom face 10c and which are boundaries between the bottom face 10c and the round faces 10r have round shapes curved three-dimensionally.

As shown in FIGS. 2, 3B, and 4A, the boundary face coverings 11c of the covering member 11 extend from the long side face covering 11a, the short side face coverings 11b and the ridge face coverings 11r to cover the boundary faces 10d along the curved faces.

Figure 5:
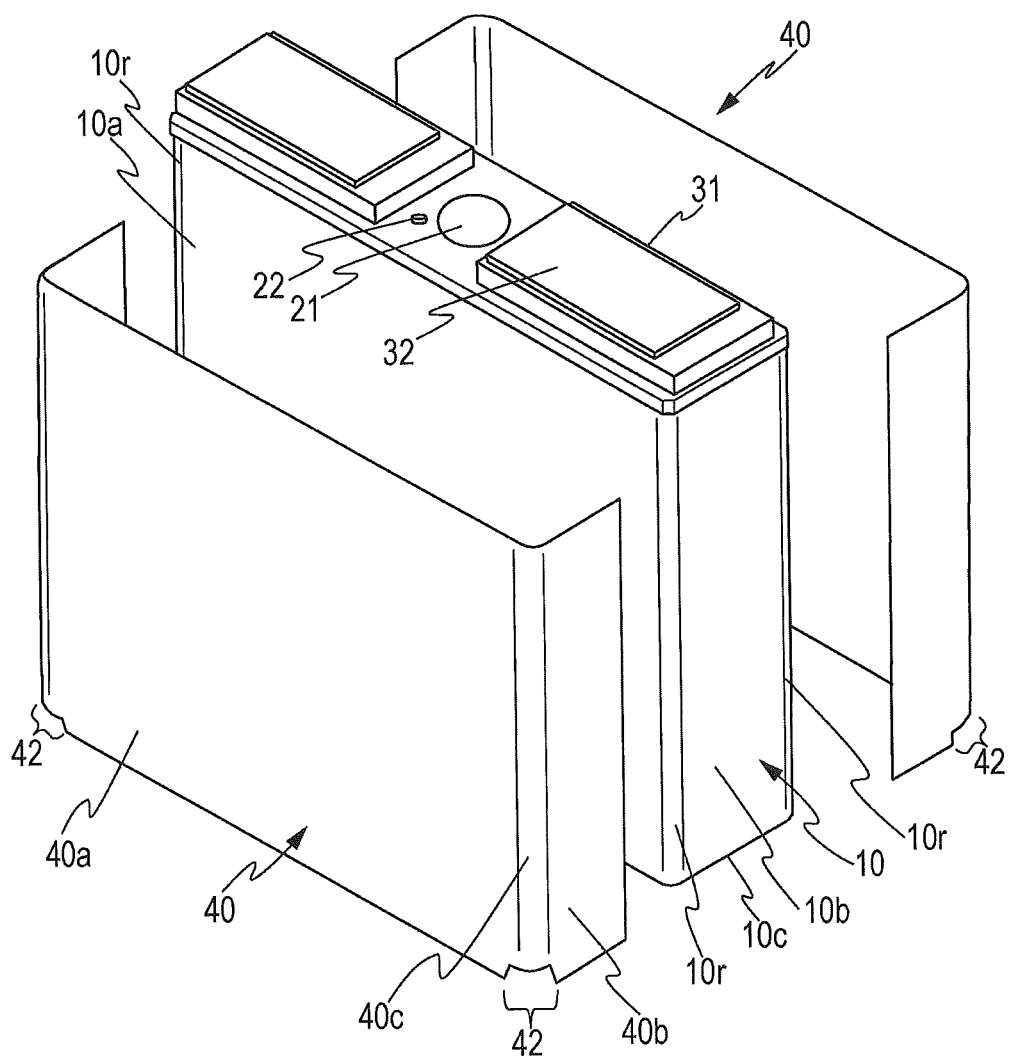
FIG. 5 shows an exploded perspective view of a structure of a covering sheet of the nonaqueous electrolyte secondary battery according to the embodiment of the present invention.

Here, in order to form the covering member 11 so that the covering member 11 accurately conforms to the curved shapes of the boundary faces 10d, the covering member in the embodiment is formed by the two covering sheets 40 shown in an exploded perspective view in FIG. 5.

The embodiment of the present invention will be further specifically described below while explaining a structure of the covering sheet 40 corresponding to the insulating sheet or the covering sheet in the present invention and an operation step of completing the covering member 11 by using the covering sheets 40 and corresponding to a method of covering the electric storage device in the present invention.

2. Covering Sheet and Covering Method

Figure 6:
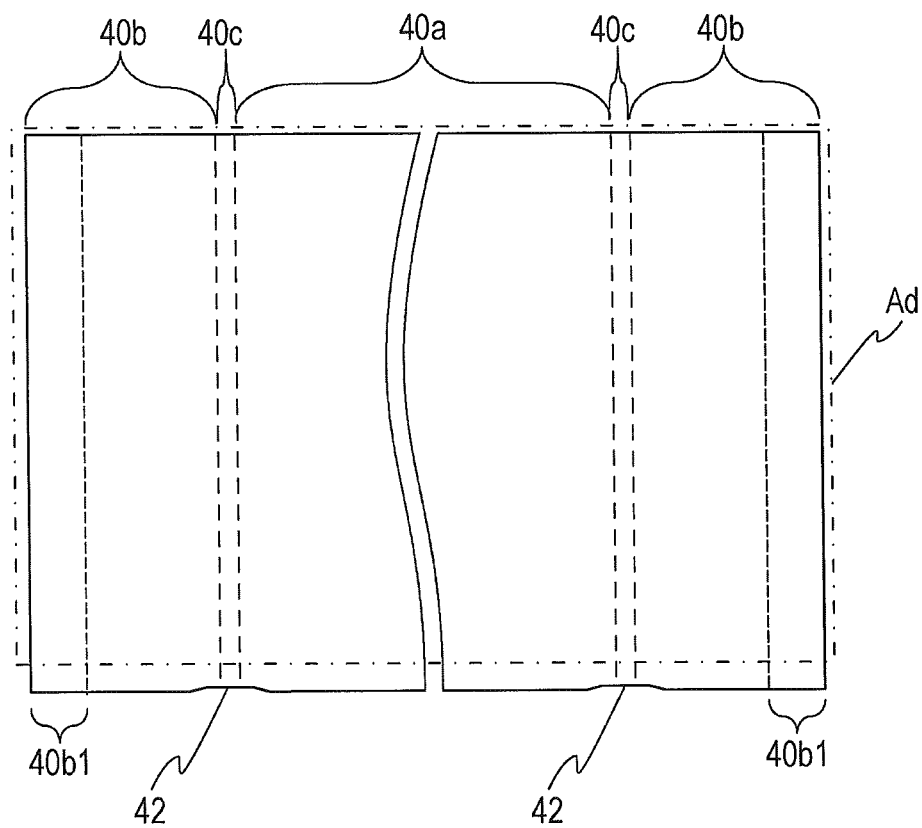
FIG. 6 shows a plan view of the structure of the covering sheet according to the embodiment of the present invention.

FIG. 6 is a schematic plan view of the structure of the covering sheet 40 according to the embodiment of the present invention. The covering sheet 40 is obtained by forming a sheet base material, made of synthetic resin such as polypropylene, polyethylene terephthalate, and polyolefin resin having an insulation property and a heat-shrinkable property and in a shape of a flat sheet having a thickness of 40 to 50 μm, into the shape conforming to the outer shape of the housing container of the nonaqueous electrolyte secondary battery 1.

To put it concretely, the covering sheet 40 is broadly divided into a main area 40a corresponding to the long side face 10a of the container main body 10 of the nonaqueous electrolyte secondary battery 1, subareas 40b positioned at opposite ends of the main area 40a and corresponding to the short side faces 10b of the container main body 10, and subareas 40c positioned at boundaries between the opposite ends of the main area 40a and the subareas 40b and corresponding to the round faces 10r of the container main body 10. Furthermore, the subareas 40b include layered areas 40b1 for overlapping the subareas 40b of the other covering sheet 40 on the short side faces 10b.

A width of each of the subareas 40b is preferably set to ⅚ of a width of the short side face 10b of the container main body 10 or a greater dimension. In this way, an entire width of the layered area 40b1 which serves as a base of the layered face covering 11b1 shown in FIG. 4B occupies ⅔ or a greater part of the width of the short side face 10b. In one example, if a width of the long side face 10a of the container main body 10 is 120 mm and a width of the short side face 10b is 12 mm, a width of the subarea 40b is 10 mm and an entire width of the layered area 40b1 is 8 mm.

On a side adjacent to each of the boundary faces 10d of the container main body, a notch portion 42 is formed at a boundary between the main area 40a and the subarea 40b between which the round face 10r is positioned. The notch portion 42 is formed as a trapezoidal shape having a shorter upper base than a lower base as shown in an enlarged view in FIG. 10A by notching the sheet base material in a shape of an inverted V widening from an inner side toward an edge end.

Next, an entire face of the covering sheet 40 on a side facing the respective faces of the container main body 10 forms an adhesive face applied with an adhesive.

The paired covering sheets 40 each of which has the structure described above are wound along the outer shape of the container main body 10 and bonded to the respective side faces so as to sandwich the nonaqueous electrolyte secondary battery 1 from sides of the long side faces 10a as shown in FIG. 5. Because the adhesive faces adhere, the wounded covering sheets 40 can be bonded to the container main body 10 without positional displacements. This step corresponds to a winding step in the present invention.

Each of the long side faces 10a and each of the round faces 10r are respectively covered with the main area 40a and the subareas 40c of the one covering sheet 40 and each of the short side faces 10b is covered with the overlap between the subareas 40b of the two covering sheets 40.

Figure 7A:
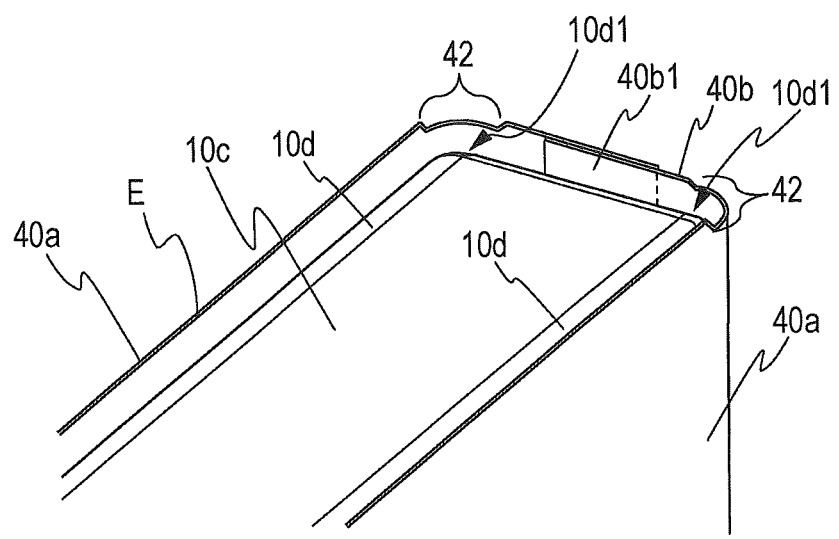
FIG. 7A shows a view explaining a processing step by using the covering sheet according to the embodiment of the present invention and FIG. 7B shows a view explaining the processing step by using the covering sheet according to the embodiment of the present invention.

FIG. 7A is an enlarged view showing a covering state of the covering sheets 40 seen from a side of the bottom face 10c of the container main body 10. Because the container main body 10 has the boundary faces 10d which are curved faces between the bottom face 10c and the long side faces 10a, the short side faces 10b, and the round faces 10r (not shown, because they are positioned in blind spots in the drawing), edges E of the main areas 40a and the subareas 40b of the covering sheets 40 protrude from the respective side faces of the container main body 10 and stand upright, although the long side faces 10a, the short side faces 10b, and the round faces 10r are respectively covered in a state in which the covering sheets 40 are bonded to the respective side faces.

Figure 7B:
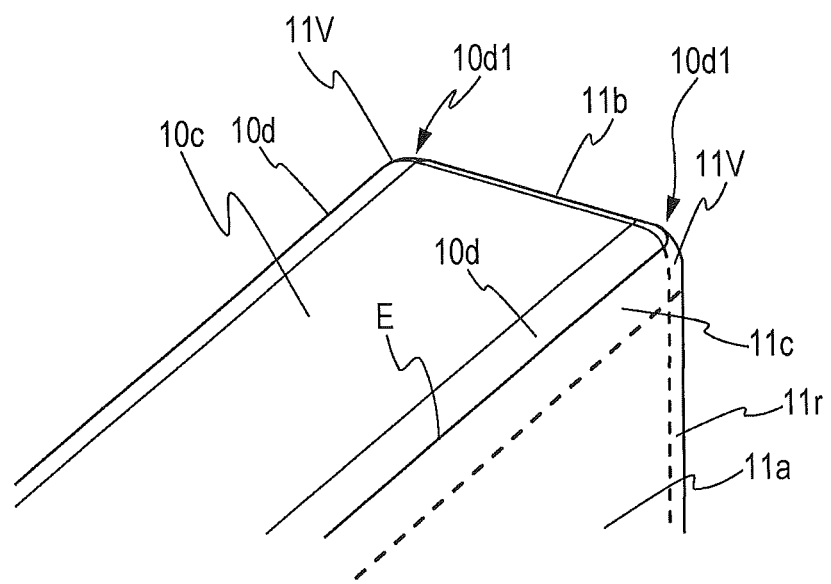

Next, by heating and heat-shrinking the covering sheets 40, the protruding edges E are shrunk and finished into shapes along surfaces of the boundary faces 10d as shown in FIG. 7B. This step corresponds to a treatment step in the present invention.

Figure 8A:
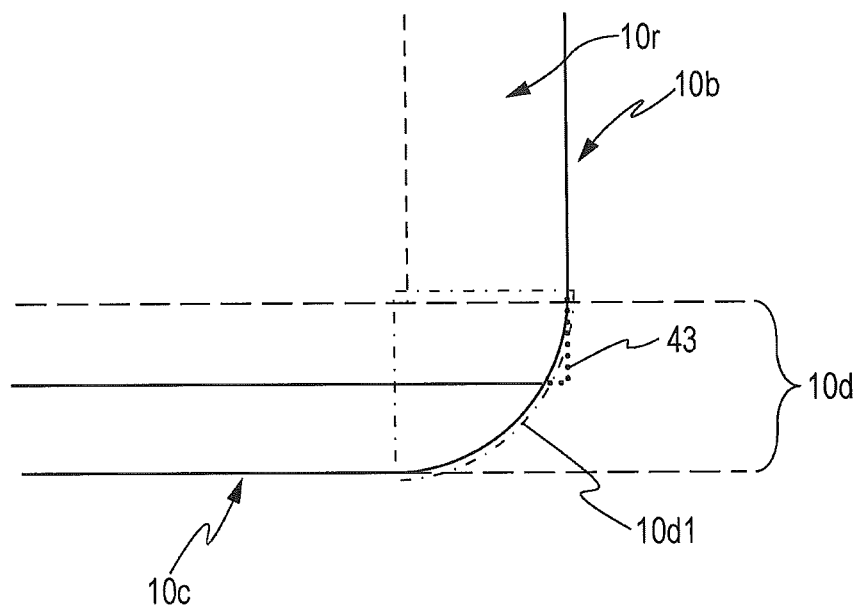
FIG. 8A shows a view explaining a covered state with a conventional covering film and FIG. 8B shows a view explaining a covered state with the covering sheet according to the embodiment of the present invention.

The embodiment is characterized in that the notch portions 42 are formed at the above-described protruding edges E of the covering sheets 40. Specifically, as shown in FIG. 8A which is a schematic enlarged view of an area Ve in FIG. 2, if the container main body 10 is covered with a cylindrical film without notch portions and the film is heat-shrunk, in the container main body 10, a surface area of a surplus portion 43 of the film is larger than an area of a vertex portion 10d1 in a portion of the boundary face 10d surrounded by a one-dot chain line in the drawing where the vertex portion 10d1 and the film face each other.

Therefore, even in consideration of heat shrinkage, remaining portions which cannot come in close contact with the boundary faces 10d and the vertex portion 10d1 are left as wrinkles or edges on the shrunk film, which prevents the film from coming in close contact with the surface of the container main body 10 without voids and accurate reflection of the shape of the boundary faces 10d on the completed covering member.

Figure 8B:
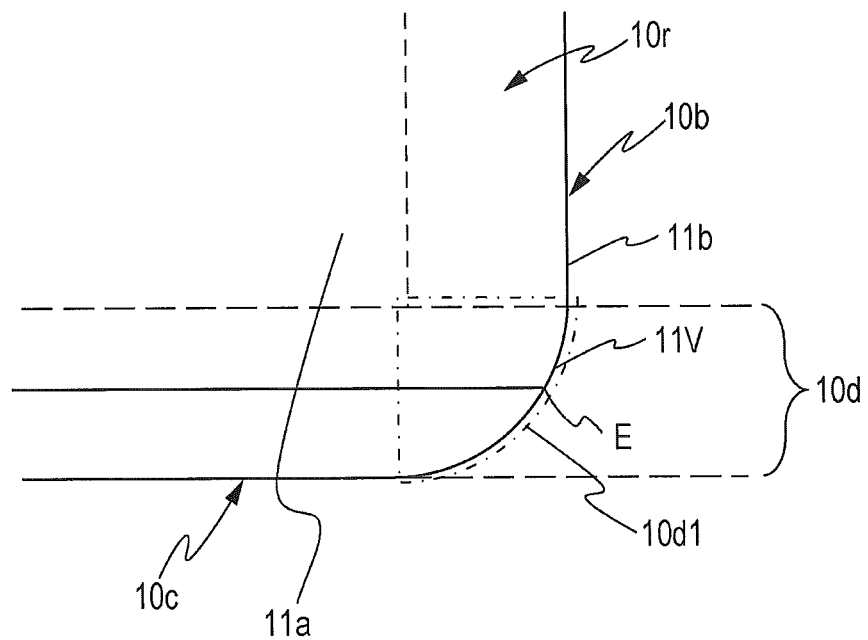

On the other hand, in the embodiment, by providing with the covering member 11 with the notch portions 42 at the portions facing the boundary faces 10d, as shown in FIG. 8B, the portions corresponding to the surplus portions 43 are removed so that the edge portions of the main areas 40a and the subareas 40b come in close contact with the boundary faces 10d without voids in the heat shrinkage of the covering sheets 40. Furthermore, by forming the notch portions 42 into the so-called trapezoidal shapes shown in FIG. 10A, shapes of vertex face coverings 11V formed after the heat shrinkage can be made similar and accurately conform to the shapes of the vertex portions 10d1 of the boundary faces 10d.

In the above structure, the boundary faces 10d correspond to boundary portions in the present invention, vertex portions 10d1 correspond to corner portions in the present invention, sides of the long side faces 10a, sides of the short side faces 10b, or portions parallel to the round faces 10r excluding the vertex portions 10d1 of the boundary faces 10d correspond to side portions in the present invention.

Furthermore, the covering member 11 surrounds the container main body 10 from sides of the long side faces 10a by using a set of two covering sheets 40 before the heat shrinkage and the opposite ends of the respective sheets overlap each other on the short side faces 10b. Therefore, it is possible to easily bond the covering member 11 to the container main body 10 without forming wrinkles to thereby aesthetically finish a surface of the covering member 11 after the heat shrinkage. The aesthetic finish of the surface of the covering member 11 exerts not only the effect of obtaining beauty of an external appearance but also the effect of reducing dimension errors of the outer shape of the nonaqueous electrolyte secondary battery 1.

Positions of the layered areas 40b1 where the two covering sheets 40 overlap each other may be any positions on the respective faces of the container main body 10 and may be on the long side faces 10a. However, it is more preferable to set the layered areas 40*b*1 on the short side faces 10*b* as in the above description, because the following effect is exerted. In other words, if the covering sheets overlap each other on the long side faces 10*a*, thicknesses of the layered face coverings 11*b*1 shown in FIG. 4B are factored into a thickness of the nonaqueous electrolyte secondary battery 1, which causes dimension errors of a module because, when the nonaqueous electrolyte secondary battery 1 is used and assembled into the module as described later, thicknesses of the nonaqueous electrolyte secondary batteries 1 are superimposed in a layered direction of nonaqueous electrolyte secondary batteries 1.

Therefore, by setting the overlap positions on the short side faces 10*b*, it is possible to keep the thicknesses in the layered direction of the nonaqueous electrolyte secondary batteries 1 within certain limits to thereby reduce the dimension errors.

Furthermore, because the entire width of each of the layered areas 40*b*1 occupies ⅔ or the greater part of the width of the short side face 10*b*, it is possible to prevent peeling of the layered face coverings 11*b*1 after the completion. Although the width of each of the subareas 40*b* is preferably set to ⅚ of the width of the short side face 10*b* of the container main body 10 or the greater dimension as described in the above description, the width of each of the subareas 40*b* should not exceed the width of the short side face 10*b* so as to prevent the layered area 40*b*1 from coming around into the long side face 10*a*.

Figure 9:
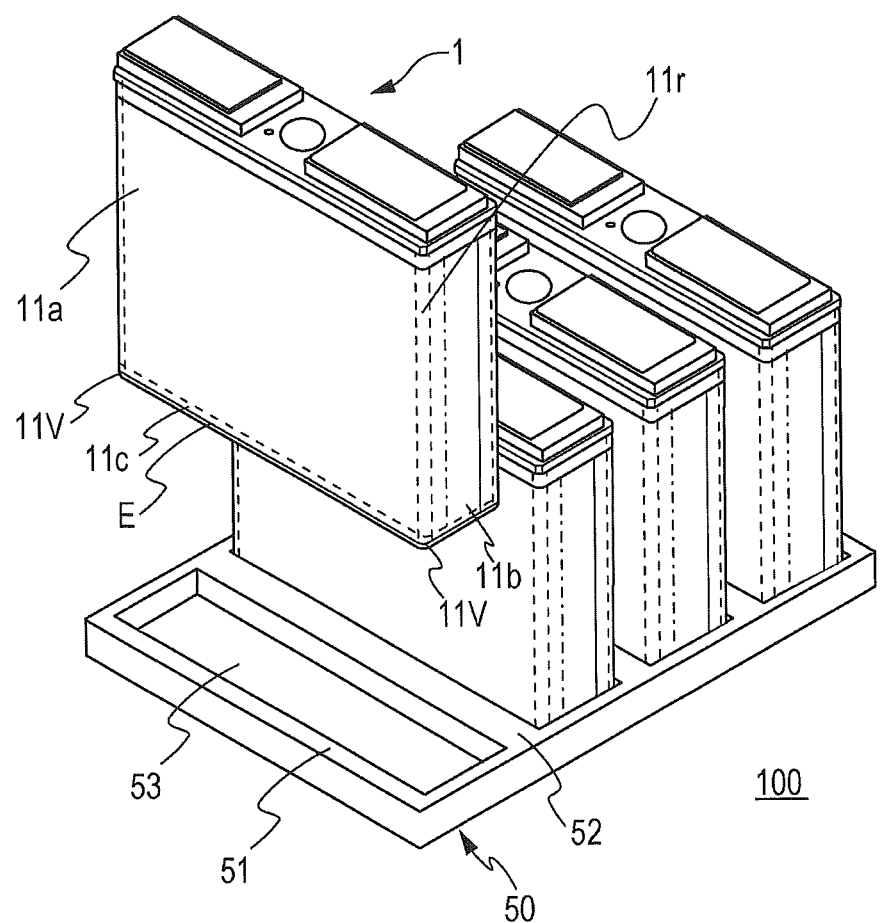
FIG. 9 shows an exploded perspective view of a structure of a power supply module according to the embodiment of the present invention.

Moreover, the embodiment exerts the following effect, because the covering member 11 has the boundary face coverings 11*c* for covering parts of the boundary faces 10*d* formed between the long side faces 10*a*, the short side faces 10*b*, and the round faces 10*r*, and the bottom face 10*c* of the container main body 10. In other words, as shown in FIG. 9, when the nonaqueous electrolyte secondary batteries 1 are used into the power supply module 100, the nonaqueous electrolyte secondary batteries 1 need to be mounted into a synthetic resin holder 50 having a plurality of placement faces 53 which are divided by a frame 51 and bars 52 orthogonal to the frame 51 and on which the nonaqueous electrolyte secondary batteries 1 are placed.

In the embodiment, because the boundary face coverings 11*c* are provided, the edges E of the covering member 11 are positioned not on the short side faces 10*b* but on lower parts, i.e., on the boundary faces 10*d* close to the bottom face 10*c*. As a result, it is possible to decrease possibilities that the edges E of the covering member 11 come in direct contact with the frame 51 or the bars 52 and that the covering member 11 peels from the container main body 10 in mounting of the nonaqueous electrolyte secondary battery 1.

As described above, according to the nonaqueous electrolyte secondary battery 1 in the embodiment, because it includes the covering member 11 formed by using the covering sheets 40, it is possible to obtain the accurate covering along the outer shape of the housing container.

Figure 10A:
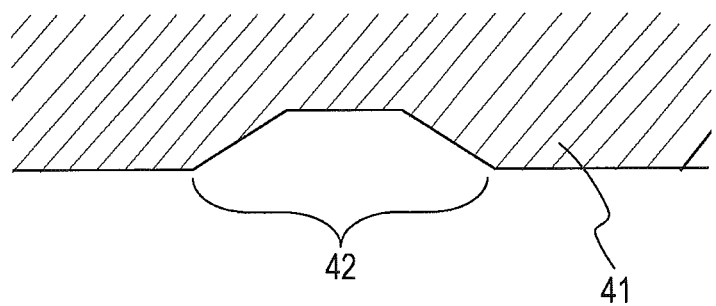
FIG. 10A shows an enlarged view of the covering sheet according to the embodiment of the present invention.
Figure 10B:
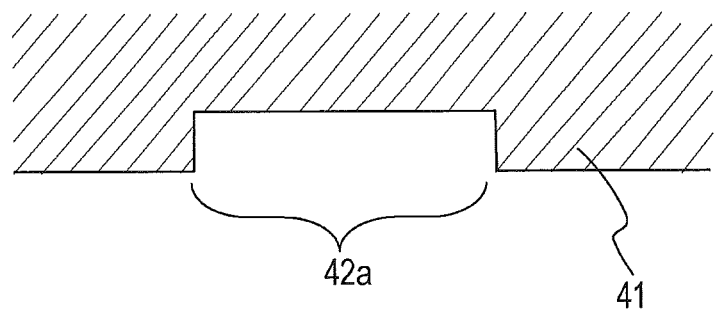
FIG. 10B shows an enlarged view of another example of the structure of the covering sheet according to the embodiment of the present invention.

However, the present invention is not limited to the above-described embodiment. Although each of the notch portions 42 corresponds to the notch in the present invention and has the trapezoidal outer shape formed by notching the sheet base material 41 in the shape of the inverted V widening from the inner side toward the edge end as shown in FIG. 10A in the above description, the notch in the present invention may have a rectangular outer shape like a notch portion 42*a* shown in FIG. 10B. If a long side portion of the rectangle extends parallel to the boundary face 10*d* of the container main body 10 and astride the long side face 10*a* and the short side face 10*b* with the round face 10*r* interposed therebetween, it is possible to substantially make a shape of a vertex face covering 11V similar to the shape of the vertex portion 10*d*1 of the boundary face 10*d* to accurately form the vertex face covering 11V in the same way as in the case of the notch portion 42.

Figure 10C:
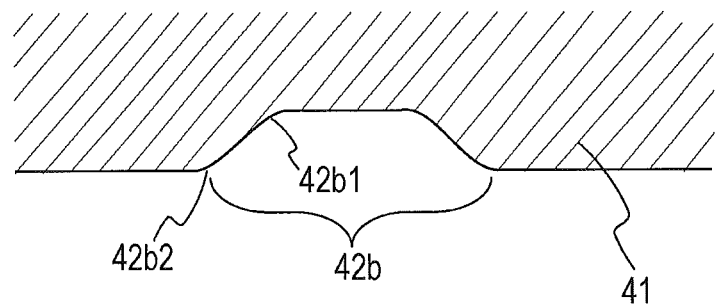
FIG. 10C shows an enlarged view of still another example of the structure of the covering sheet according to the embodiment of the present invention.

Furthermore, like a notch portion 42*b* shown in FIG. 10C, corners of portions 42*b*1 and 42*b*2 corresponding to vertexes of the notch portion 42 may be rounded. It is possible to further suppress a possibility that edges remain on the vertex face covering 11V after the heat shrinkage to thereby increase accuracy of conformity to the shape of the boundary face 10*d*.

Although each of the notch portions 42, 42*a*, and 42*b* is in the substantially rectangular shape in the above description, the notch in the present invention may be formed by notching the sheet base material 41 in any shape such as a circle and a triangle to conform to the outer shape of the housing container, as long as the covering is formed along the surface of the container while conforming to the shape of the housing container in the covering member after the heat shrinkage.

Furthermore, although the covering member 11 is formed by the paired covering sheets 40 having the same shapes in the above description, the shapes of the two covering sheets may not be completely the same, as long as the layered areas 40*b*1 are positioned on the short side faces 10*b*. For example, one and the other covering sheets may have subareas 40*b* of different entire widths.

Although the covering member 11 has the paired covering sheets 40 having the same shapes and is formed by the respective covering sheets 40 in which the notch portions 42 are formed in the above description, the covering member in the present invention may be formed by (a) covering sheet(s) having notches irrespective of the number of covering sheets.

In one example, like a covering sheet 140 shown in a schematic bottom view of FIG. 11, the present invention may be realized as a structure in which opposite ends of the single sheet form a layered area 140*b*1 on only one of short side faces 10*b* of a container main body 10. The covering sheet 140 has a similar notch portion to that of the covering sheet 40 to thereby make edge portions of main areas 140*a* and subareas 140*b* similar to shapes of boundary faces 10*d* and vertex portions 10*d*1 and to bring the edge portions into close contact with the boundary faces 10*d* and the vertex portions 10*d*1 without voids.

Even if the notch portions 42 are omitted in the paired covering sheets 40 shown in FIG. 5 to form the covering sheet in the present invention, it is possible to keep the structure in which the plurality of covering sheets respectively cover the entire faces of the long side faces 10*a* of the container main body 10 and form the layered areas 140*b*1 on the short side faces 10*b*.

In this way, the effects of the present invention, i.e., easy bonding of the covering sheets to the container main body 10 without forming wrinkles and aesthetic finishing of the surface of the covering member 11 after the heat shrinkage to reduce dimension errors of the outer shape of the nonaqueous electrolyte secondary battery 1, are exerted.

Although the covering sheets 40 can be caused to conform to the shapes of the boundary faces 10*d* and brought in close contact with the boundary faces 10*d* without voids by the heat shrinkage because they have the notch portions 42 in the above description, the insulating sheet or the covering sheet in the present invention may be realized as a structure in which portions corresponding to the vertex portions 10*d*1 of the boundary faces 10*d* have smaller thicknesses than the other portions. By increasing degrees of heat shrinkage at the vertex portions 10*d*1, the similar effects to those when the notch portions 42 are formed can be exerted.

The insulating sheet or the covering sheet in the present invention may be a structure without the notch portions 42. In this case, by heating the portions corresponding to the vertex portions 10*d*1 for a longer time than the other portions or at a higher temperature than the other portions in heating the sheets, the similar effects to those when the notch portions 42 are formed can be exerted.

Although the adhesive is applied on the entire face on the side of the covering sheet 40 facing the container main body 10 to form the adhesive face in the above description, the present invention may be a structure in which an adhesive face is formed at only part of the insulating sheet or the covering sheet and used as an adhesive portion. In particular, it is more preferable to form an adhesive face only in an area Ad directly facing only the long side faces 10*a*, the short side faces 10*b* and round faces 10*r* of the container main body 10 and not directly facing the boundary faces 10*d* as shown in FIG. 6, because the edge portions of the covering sheets 40 standing upright before the heat shrinkage and shown in FIG. 7A can be formed by the sheets alone and it is easy to control the heat shrinkage. Moreover, although the entire covering sheets 40 are heat-shrunk, it is also possible to heat so that at least the portions corresponding to the boundary faces 10*d* are heat-shrunk.

The covering sheets 40 may be a structure not having the adhesive portion at all. In this case, even if the covering member 11 and the container main body 10 are not in close contact with each other at any portions, the covering member 11 after the heat shrinkage has a three-dimensional shape conforming to the outer shape of the container main body 10, it is possible to obtain an accurate covering conforming to the shape of the boundary faces 10*d*.

In the above description, the housing container of the nonaqueous electrolyte secondary battery 1 is in the outer shape of the substantially quadrangular prism and has the lid portion 20 as the upper face, the bottom face 10*c* of the container main body as the bottom face, and the paired long side faces 10*a* and the paired short side faces 10*b* as the four side faces, the round faces 10*r* as the round portions are formed between the adjacent side faces, and the boundary faces 10*d* as the boundary portions and having the round shapes are formed between the bottom face and the side faces.

Figure 12:
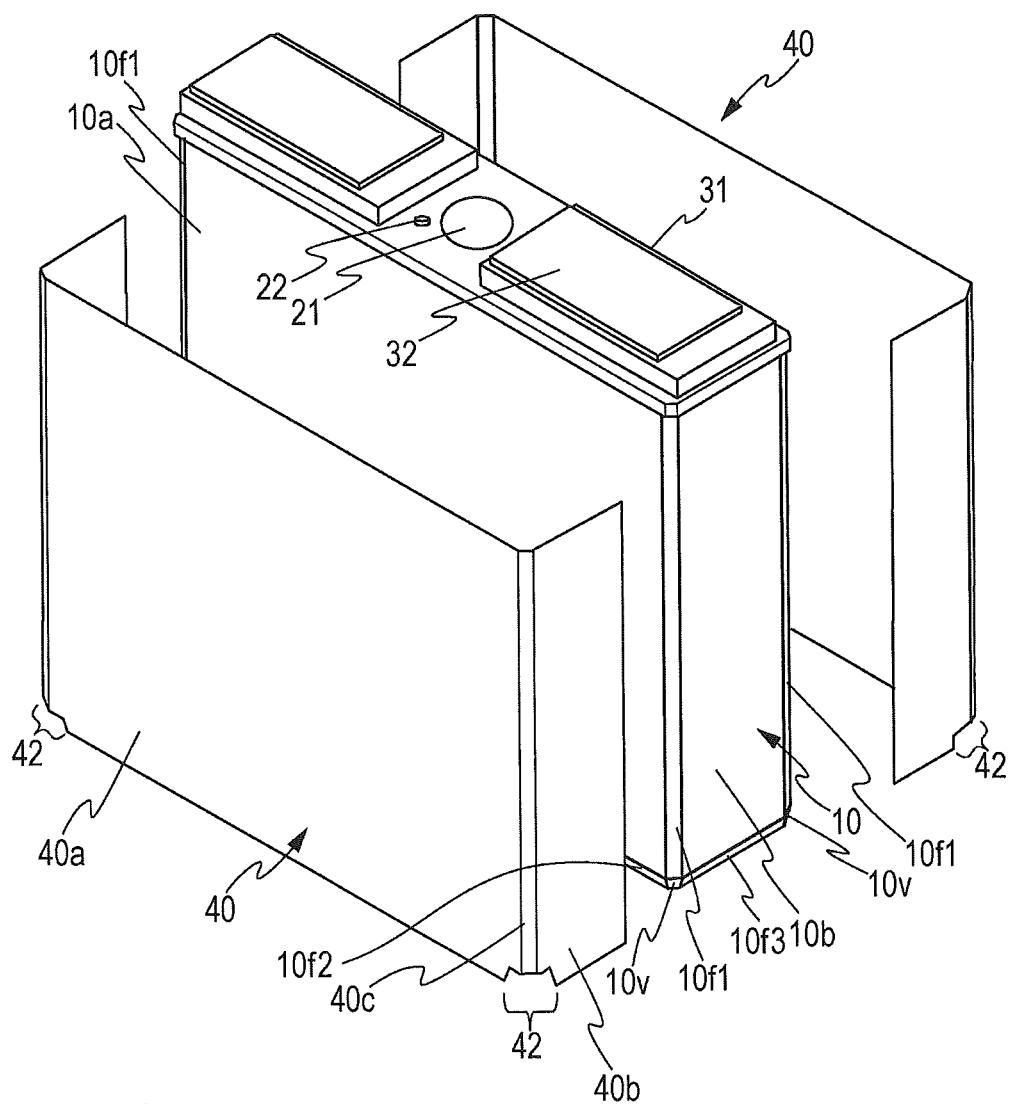
FIG. 12 shows a view explaining other examples of the nonaqueous electrolyte secondary battery and the covered state with the covering sheet according to the embodiment of the present invention.

However, the housing container in the present invention may have flat faces formed between the adjacent side faces and between the bottom face and the side faces. In other words, as shown as an example by a nonaqueous electrolyte secondary battery 2 in FIG. 12, in the container main body 10, chamfered portions 10/1 between long side faces 10*a* and short side faces 10*b*, chamfered portions 10/2 between the long side faces 10*a* and a bottom face 10*c*, and chamfered portions 10/3 between the short side faces 10*b* and the bottom face 10*c* are formed respectively. Moreover, chamfered portions 10*v* are formed at positions respectively adjacent to the chamfered portions 10/1 to 10/3 and corresponding to vertexes of the container main body 10.

All of the chamfered portions 10/1 to 10/3 and 10*v* are flat faces and they may be formed by processing the container main body 10 formed by pressing or may be formed together with an outer shape of the container main body 10 by welding or the like. The chamfered portions 10/1 correspond to chamfered portions in the present invention and the chamfered portions 10/2, 10/3, and 10*v* correspond to chamfered boundary portions in the present invention.

In the case of a structure having this container main body 10, it is possible to finely cover the chamfered portions 10/1 to 10/3 and 10*v* by covering the container main body 10 with the covering member using the covering sheets 40 which are the insulating sheet or the covering sheet in the present invention. Although the covering sheets 40 are bent to conform to the shapes of the chamfered portions 10/1 in FIG. 12, they may be curved similarly to those in the example in FIG. 5, as long as they can be wound around and bonded to the container main body 10.

Although the power generating element in the present invention is of a winding-type in the above description, it may be a layered-type power generating element.

Although the electric storage device in the present invention is the nonaqueous electrolyte secondary battery 1 represented by the lithium ion secondary battery in the above description, it may be other various secondary batteries such as a nickel-metal hydride battery, as long as it is a battery which can be charged and discharged by electrochemical reactions. The electric storage device in the present invention may be a primary battery. Alternatively, it may be a device such as an electric double layer capacitor which directly accumulates electricity as electric charge. In short, the electric storage device in the present invention is not limited to a specific method, as long as it is a device which can accumulate electricity.

Although the housing container formed by the container main body 10 and the lid portion 20 corresponds to the housing container in the present invention and the covering member 11 covers the container main body 10 in the above description, the covering member in the present invention may be realized as a structure for covering both of the lid portion and the container main body.

It is sufficient that the edge end of the covering member reaches part of the boundaries between the bottom portion and the side faces of the housing container and comes in close contact along the shapes of the parts in the covering member in the present invention and the present invention is not limited by arrangements, functions, and the number of members forming the housing container to be covered.

Although the container main body 10 is made of aluminum in the above description, it may be made of any other metals or metal compounds such as an aluminum alloy and stainless steel.

Although the covering sheet or the insulating sheet in the present invention is described in the above description as the sheet to be applied to the electric storage device having the housing container in the shape of the quadrangular prism and formed by the container main body 10 and the lid portion 20, the covering sheet or the insulating sheet in the present invention may be applied to a prismatic container for housing liquid or powder such as fuel and a chemical agent besides the housing container of the electric storage device. Although the prismatic container preferably has the outer shape of the quadrangular prism, it may have a prismatic shape having a bottom face in any polygonal shape. Depending on use of the container, the covering sheet in the present invention may be made of material without the insulation property.

Although the single nonaqueous electrolyte secondary battery 1 is taken as an example in the above description, the present invention may be realized as a power supply module including the electric storage device according to the present invention as at least one of the plurality of electric storage devices shown as an example in FIG. 9.

In essence, the present invention may be carried out by adding various modifications, including those described above, to the above-described embodiment without departing from the gist of the present invention.

The present invention described above has the effect of accurately covering the electric storage device along the outer shape of the housing container and is useful to the electric storage device such as the secondary battery.

What is claimed is:

1. An electric storage device, comprising:
a power generating element;
a metal housing container for housing the power generating element and including an upper face, a bottom face, and four side faces, the upper face being formed with an electrode terminal; and
a covering member formed by winding an insulating sheet around the four side faces of the metal housing container,
wherein the metal housing container includes:
round portions or chamfered portions formed between adjacent side faces; and
round or chamfered boundary portions formed between the bottom face and each of the four side faces,
wherein the covering member covers said each of the four side faces, the round portions or the chamfered portions, and parts of said boundary portions formed between the bottom face and said each of the four side faces,
wherein the boundary portions of the metal housing container have side portions and corner portions conforming to a planar shape of the bottom face,
wherein notches are formed at positions of the insulating sheet corresponding to the corner portions of the metal housing container, and
wherein the notches are formed on the insulating sheet of the covering member, and are not formed on the metal housing container.

2. The electric storage device according to claim 1, wherein a three-dimensional shape of the covering member conforms to an outer shape of the metal housing container.

3. The electric storage device according to claim 1, wherein the covering member is in contact with a surface of the metal housing container.

4. The electric storage device according to claim 1, wherein the insulating sheet includes an adhesive portion on a face of at least a portion facing the metal housing container.

5. The electric storage device according to claim 1, wherein the insulating sheet comprises a plurality of sheets to form the covering member.

6. The electric storage device according to claim 1, wherein the insulating sheet has a heat-shrinkable property, and
wherein the covering member covers the metal housing container with the insulating sheet heat-shrunk at least at the parts of the boundary portions.

7. A power supply module comprising at least one electric storage device according to claim 1.

8. A covering sheet to be wound around a metal container including an upper face including an electrode terminal, a bottom face, and four side faces, round portions or chamfered portions formed between adjacent side faces, and round or chamfered boundary portions formed between the bottom face and each of the four side faces, the boundary portions having side portions and corner portions conforming to a planar shape of the bottom face,
wherein notches are formed at positions corresponding to the corner portions of the metal container,
wherein the covering sheet covers said each of the four side faces, the round portions or the chamfered portions, and parts of said boundary portions formed between the bottom face and said each of the four side faces, and
wherein the notches are formed on the covering sheet, and are not formed on the metal container.

9. The covering sheet according to claim 8, wherein the notches have trapezoidal shapes.

10. The covering sheet according to claim 8, wherein an adhesive portion is formed at least at a portion on a surface facing a surface of the metal container.

11. The covering sheet according to claim 8, having an entire width which corresponds to a half or greater part of an entire circumference of the four side faces and the round portions or the chamfered portions of the metal container.

12. A container covering method of covering a metal container including an upper face including an electrode terminal, a bottom face, and four side faces, round portions or chamfered portions formed between the adjacent side faces, and round or chamfered boundary portions formed between the bottom face and each of the four side faces, the boundary portions having side portions and corner portions conforming to a planar shape of the bottom face,
the method comprising:
winding an insulating sheet around the four side faces and the round portions or the chamfered portions of the metal container; and
treating the wound insulating sheet to form a covering member for covering said each of the four side faces, the round portions or the chamfered portions, and parts of said boundary portions formed between the bottom face and said each of the four side faces,
wherein notches are formed at positions of the insulating sheet corresponding to the corner portions of the metal container, and
wherein the notches are formed on the insulating sheet of the covering member, and are not formed on the metal container.

13. The container covering method according to claim 12, wherein an edge of the insulating sheet protrudes from the side faces to reach the parts of the boundary portions in the winding, and
wherein a three-dimensional shape of the covering member is caused to conform to an outer shape of the metal container in the treating the wound insulating sheet.

14. The container covering method according to claim 13, wherein the insulating sheet comprises a heat-shrinkable sheet including the notches formed at the positions corresponding to the corner portions of the metal container, and
wherein the treating the wound insulating sheet includes heating a portion of the insulating sheet including the notches.

15. The electric storage device according to claim 1, wherein the covering member covers an entirety of said each of the four side faces.

16. The electric storage device according to claim 1, wherein, in a plan view, the boundary portions are located between said each of the four side faces and the bottom face.

17. The covering sheet according to claim 8, wherein the covering sheet has a heat-shrinkable property, and
wherein the covering sheet covers the metal container with the covering sheet heat-shrunk at least at the parts of the boundary portions.

18. The covering sheet according to claim 8, wherein the covering sheet covers an entirety of said each of the four side faces.

19. The covering sheet according to claim 8, wherein, in a plan view, the boundary portions are located between said each of the four side faces and the bottom face.

20. The electric storage device according to claim 1, wherein the notches extend in the insulating sheet of the covering member in a trapezoidal shape having a shorter upper base than a lower base.

\* \* \* \* \*